US005233347A

United States Patent [19]

Dahl et al.

[11] Patent Number: 5,233,347

[45] Date of Patent: Aug. 3, 1993

[54] SYNCHRONOUS MANUFACTURING SERVICE REQUEST AND ACKNOWLEDGE PANEL CIRCUIT

[75] Inventors: Craig M. Dahl, Union Lake; Rodger G. Rahhal, Canton, both of Mich.

[73] Assignee: General Motors Corporation, Detroit, Mich.

[21] Appl. No.: 739,575

[22] Filed: Aug. 2, 1991

[51] Int. Cl.[5] ............ H04B 1/00

[52] U.S. Cl. ............ 340/825.68; 340/825.35; 340/502

[58] Field of Search ............ 340/825.68, 825.06, 340/825.14, 825.17, 825.35, 332, 500, 501, 503, 502

[56] References Cited

U.S. PATENT DOCUMENTS

| | | | |
|---|---|---|---|
| Re. 24,031 | 6/1955 | Marmorstone . | |
| 1,575,599 | 3/1926 | Hornberger . | |
| 1,867,134 | 7/1932 | Bobroff . | |
| 3,430,224 | 2/1969 | Krantz | 340/313 |
| 3,824,560 | 7/1974 | Vitolo et al. . | |
| 3,889,252 | 6/1975 | Cox, III et al. | 340/313 |
| 4,614,944 | 9/1986 | Schwan | 340/825.68 |
| 4,940,963 | 7/1990 | Gutman et al. | 340/313 |

*Primary Examiner*—Donald J. Yusko
*Assistant Examiner*—Dervis Magistre
*Attorney, Agent, or Firm*—Anthony Luke Simon

[57] ABSTRACT

An apparatus suitable for implementation in synchronous manufacturing systems includes operator stations, a request panel and an acknowledge panel. The operator stations are coupled to the request panel and send request signals to the request panel. The request panel converts the request signals from the operator stations to serial data and transmits that data in a data burst to the acknowledge panel at a remote location in the plant. The acknowledge panel signals the data requests to an operator at the acknowledge panel. Push buttons at the acknowledge panel provide acknowledge signals to the acknowledge panel, which converts the acknowledge signals to serial data and transmits that data in a data burst to the request panel. The request panel transmits the data it receives to the operator stations.

5 Claims, 4 Drawing Sheets

SYNCHRONOUS MANUFACTURING SERVICE REQUEST AND ACKNOWLEDGE PANEL CIRCUIT

This invention relates to synchronous manufacturing systems and more particularly to apparatus for aid of parts supply in synchronous manufacturing systems by providing service request and request acknowledgment signals.

BACKGROUND OF THE INVENTION

Modern manufacturing techniques that improve efficiency and cost control for manufacturers include synchronous manufacture. In synchronous manufacturing, it is desirable to have a system by which a manufacturing line operator has a limited number of parts at the operator station that are replenished when necessary. This type of system saves on floor space, improves quality control, and saves in manufacturing costs.

In such a system, a means is necessary by which the manufacturer can keep track of parts, and supply the parts to the operator when the current supply of parts is substantially exhausted. In some instances, large computer systems have been implemented in manufacturing plants to track parts, and determine when operator stations need a re-supply of parts. Such computer systems, however, are very expensive, both to develop and to install, which may require installing various terminals, communications ports, and other expensive communications hardware.

SUMMARY OF THE PRESENT INVENTION

This invention provides an apparatus suitable for use in synchronous manufacturing systems to aid in the supply of parts and materials to operator stations on a manufacturing line. The apparatus of this invention allows an operator at a station to make an individual parts/material/service request, which is displayed at a specific remote location. A parts/material/service coordinator at the remote location can acknowledge the service request, transmitting the acknowledgment back to the requesting operator station.

The apparatus of this invention may be constructed with inexpensive readily available circuit components and is easily and inexpensively installed in a manufacturing facility. This invention uses synchronous communications so no start or stop bits are required and is expandable to accommodate an increased number of operator stations.

Implementation of this invention comprises a set of operator stations, a request panel, and an acknowledge panel. Each operator station contains a momentary push button and light. When a parts/material/service request is necessary, the operator uses the push-button, which turns on the light at the operator station. The request panel converts the discrete inputs from all of the operator stations into serial communications data for transmission to the acknowledge panel and converts serial communications from the acknowledge panel to discrete output data for the operator stations. The acknowledge panel contains a set of lights and push buttons. The acknowledge panel receives the serial data from the request panel, and lights specific lights on the acknowledge panel corresponding to which operator stations made requests. An operator at the acknowledge panel can turn off a light on the acknowledge panel by depressing the corresponding push button switch. The data from the acknowledge panel is converted to serial communications data and transmitted back to the request panel, which converts the data to discrete data for the operator stations. At the operator station the light is turned off as it is turned off on the acknowledge panel, acknowledging to the operator that the request has been received.

An advantage of this invention is that the request panel and acknowledge panel may have identical circuitry, with switches and jumpers easily installed and toggled to convert an acknowledge panel circuit to a request panel circuit, and vice versa. The additional difference between the request and acknowledge panels is that the acknowledge panel includes the push button switches and indicator lamps, while the push button switches and indicator lamps corresponding to the request panel are located at the operator stations.

Structurally, this invention comprises a set of operator stations, each station of the set comprising an operator push button and an operator indicator lamp, each operator push button, when depressed, sending a request signal. A request panel is coupled to the operator stations and includes means for receiving first serial data in a first data burst through a serial interface and for converting that serial data to discrete data corresponding to bits of on and off status data, each bit corresponding to one request indicator lamp and one acknowledge indicator lamp. The request panel also includes means for altering bits of the discrete data in response to the request signals from the operator push buttons such that the altered bits are on status data for the corresponding request indicator lamps and the corresponding acknowledge indicator lamps. A means within the request panel drives the operator indicator lamps in response to the discrete data. Another means within the request panel converts the discrete data to second serial data and transmits the second serial data in a second data burst through the serial interface.

An acknowledge panel comprises a set of push buttons and indicator lamps including an acknowledge push button and an acknowledge indicator lamp corresponding to each operator push button and operator indicator lamp, each acknowledge push button, when depressed, sending an acknowledge signal. The acknowledge panel also includes means for receiving the second data burst through the serial interface and for converting second serial data in the second data burst to the discrete data. Means within the acknowledge panel alters bits of the discrete data in response to the acknowledge signals from the acknowledge push buttons such that the altered bits are off status data for the corresponding request indicator lamps and the corresponding acknowledge indicator lamps. Means within the acknowledge panel drives the acknowledge indicator lamps in response to the discrete data. Another means within the acknowledge panel converts the discrete data to the first serial data and transmits the first serial data in the first data burst through the serial interface.

The first and second data bursts include synchronizing signals so that the apparatus is self synchronizing. The apparatus operates in a cyclical manner with the request panel and acknowledge panel each alternately receive a data burst and then send a data burst.

A more detailed description of this invention is set forth below.

DETAILED DESCRIPTION OF THE INVENTION

Figure 1:
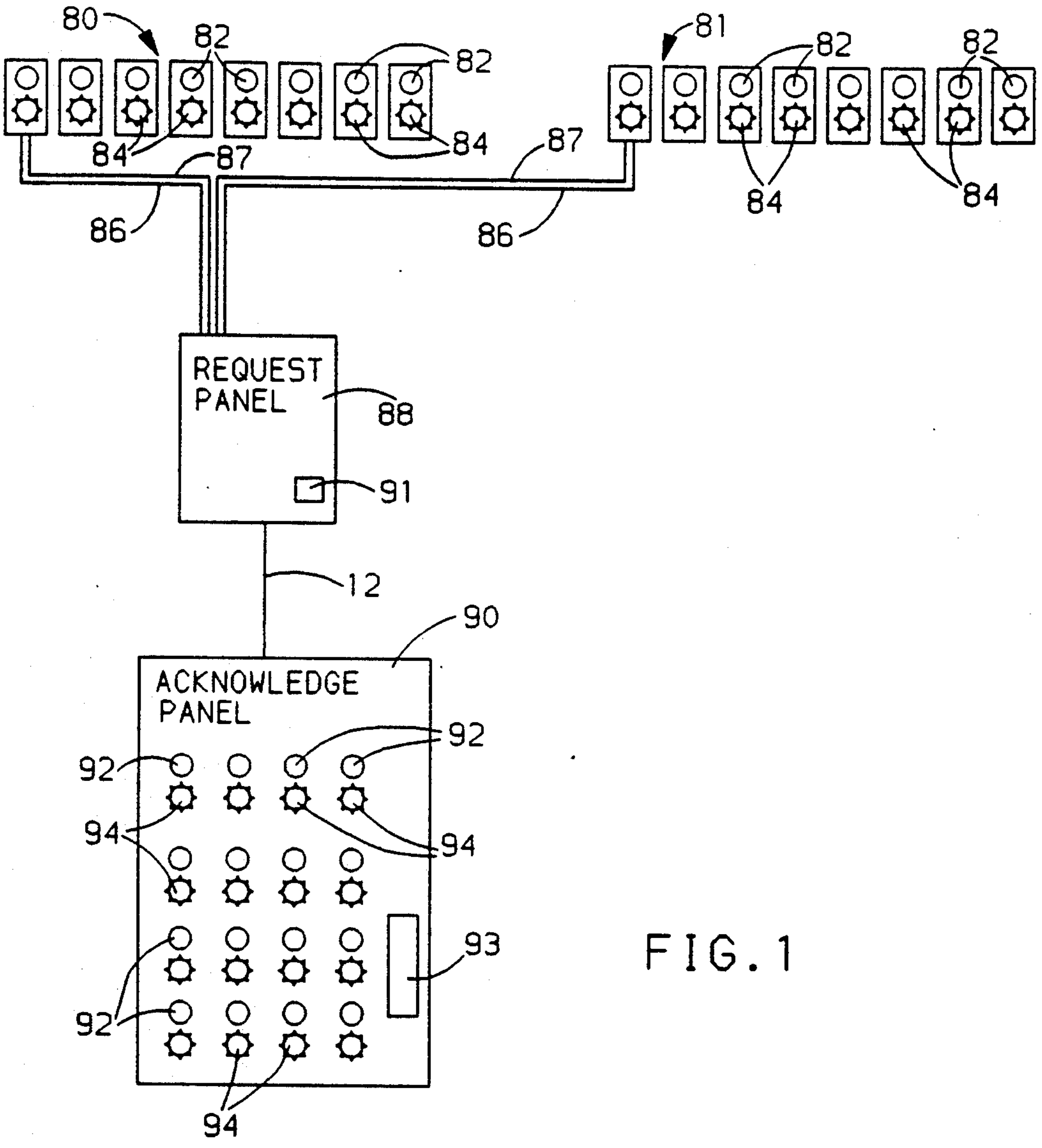
FIG. 1 is a block diagram of the apparatus of this invention.

Referring to FIG. 1, the implementation of this invention shown includes a set of operator stations 80, 81, request panel 88, including circuit 91, serial interface 12 and acknowledge panel 90, including circuit 93. Each operator station includes a push button 82 and an indicator lamp 84. Acknowledge panel 90 includes an acknowledge push button 92 and an acknowledge indicator lamp 94 corresponding to each operator push button 82 and operator indicator lamp 84. Serial interface 12 preferably comprises a two line cable that couples request panel 88 and acknowledge panel 90.

Circuit 91, within request panel 88, receives a data burst of serial data from serial interface 12, and converts the serial data to discrete data bits. One discrete data bit corresponds to each operator station 80, 81 and indicates an on or off state for each corresponding indicator lamp 84. A lamp driver means within circuit 91 drives indicator lamps 84, via lines 87, in accordance with the discrete data bits stored within circuit 91.

Each individual operator station 80, 81 is located with a different operator on a manufacturing line or assembly line and coupled to a request panel 88 through lines 86 and 87. When an operator at a specific station 80, 81 requires service/materials/ parts for that station, the operator depresses the push button 82 at that station, sending a request signal through line 86 to the request panel 88.

Circuit 91 receives the request signals form the operator push buttons 82 and alters the discrete data bits corresponding to operator stations 80, 81 that sent request signals. Circuit 91 alters the corresponding data bits so that they indicate an on state for the corresponding indicator lamps, if the data bits do not already indicate the on state. Indicator lamps 84 reflect the changes in the states of the discrete data bits through the lamp driver means and lines 87.

Circuit 91 converts the discrete data to a serial data signal and transmits the serial data signal in a data burst, through interface 12, to acknowledge panel 90. After transmitting the data burst, circuit 91 waits to receive the next data burst from acknowledge panel 90.

In acknowledge panel 90, circuit 93 receives the data burst sent by request panel 88 through interface 12 and converts the serial data in the data burst to the bits of discrete data. A means within circuit 93 drives the acknowledge indicator lamps 94 in response to the discrete data.

The push buttons 92 and indicator lamps 94 on the acknowledge panel 90 are labeled to indicate to which operator station each push button 92 and indicator lamp 94 correspond. In this manner, an operator at the acknowledge panel knows which operator station 80, 81 made a service/material/parts request. When the operator at the acknowledge panel notes a request via a particular lamp 94, the operator may arrange for service/-material/parts to be delivered to the requesting operator station 80, 81. The operator at the acknowledge panel then depresses the button 92 corresponding to the lamp 94 which is lit, requesting the particular service/-material/parts.

Depressing the acknowledge push buttons 92 sends acknowledge signals to circuit 93, which alters the bits of discrete data corresponding to the push button 92/indicator lamp 94 pairs from which the acknowledge signals came. Circuit 93 alters the corresponding data bits so that they indicate an off state for the corresponding indicator lamps, if the data bits do not already indicate the off state. Indicator lamps 94 reflect the changes in the state of the discrete data bits through the means, within circuit 93, for driving the lamps.

Circuit 93 converts the discrete data to a serial data signal and transmits the serial data signal in a data burst through interface 12 to request panel 88. After transmitting the data burst, circuit 93 waits until another data burst is received from request panel 88.

In this manner, when a push button 82 is depressed at an operator station 80, 81, the corresponding lamp 84 goes on. At the acknowledge panel 90, the corresponding indicator lamp 94 also goes on. When the corresponding acknowledge push button 92 is depressed, both the indicator lamp 94 at the acknowledge panel and the indicator lamp 84 at the request panel go off.

The transfer of data between the request panel 88 and acknowledge panel 90 is cyclical, with the request panel transmitting a burst of data to the acknowledge panel 90 and then receiving a burst of data from the acknowledge panel 90. The acknowledge panel 90 operates similarly, receiving a burst of data from the request panel 88 and then transmitting a burst of data.

The circuits 91 and 93 in the request panel 88 and the acknowledge panel 93 may be identical circuits, with only the configuration of the two circuits varying. Example circuits 91 and 93 are explained below in detail with reference to FIGS. 4 and 5.

Figure 2:
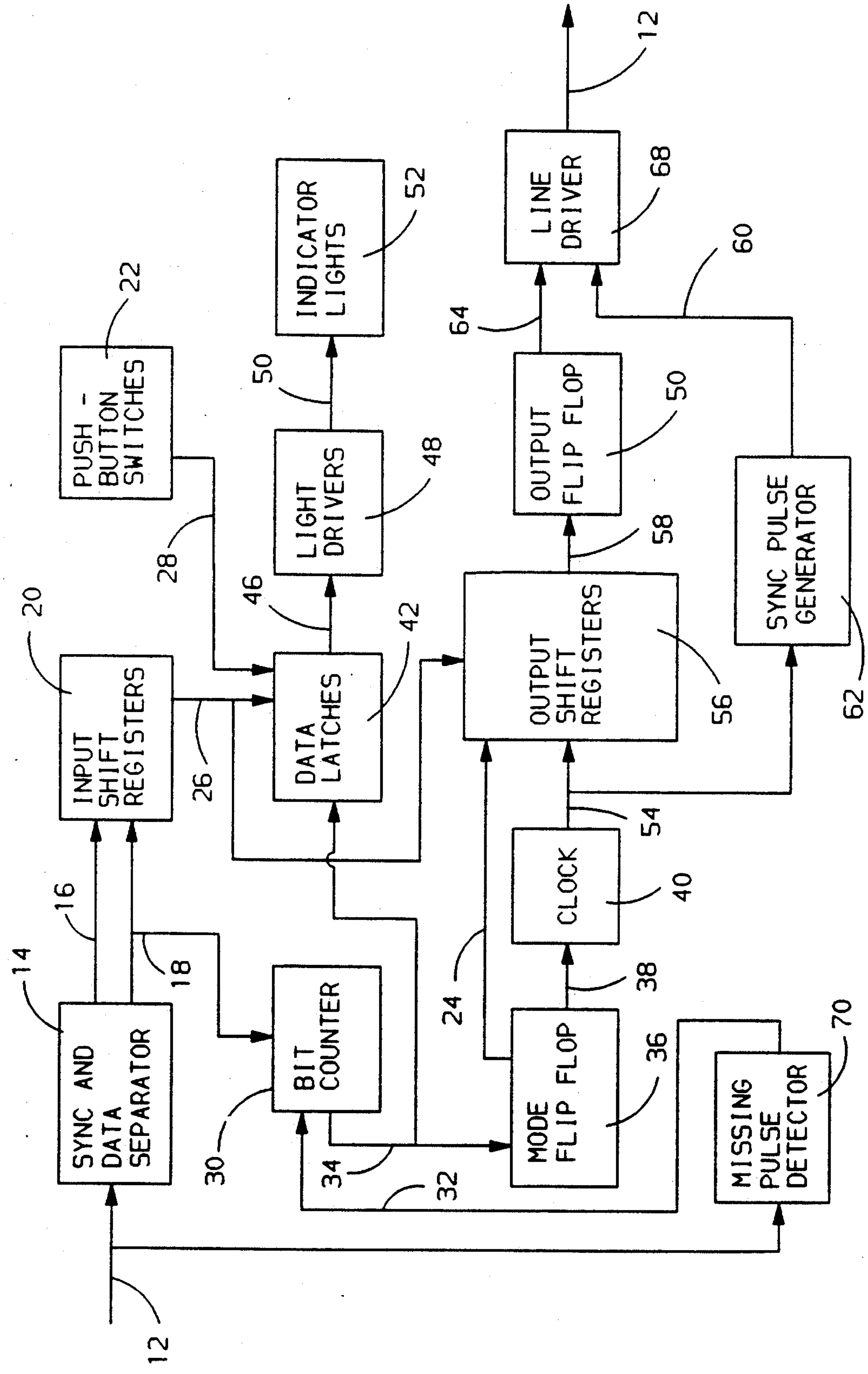
FIG. 2 is illustration of how this invention may be implemented in a synchronous manufacturing system.

Referring to FIG. 2, a block diagram of the apparatus of this invention is shown. The block diagram is the same for both the request panel and the acknowledge panel. The circuit of the apparatus of this invention is configured to be either a request panel or an acknowledge panel circuit through installation of jumpers and-/or the setting of selector switches. The request/acknowledge panel configuration will be explained in more detail further below.

According to the block diagram of FIG. 2, a first serial data burst of synchronized data is received by the circuit through line 12. The line 12 is preferably a twisted pair cable and connects the request panel and the acknowledge panel. The circuit is preferably operated at a baud rate of 1200 and an operating voltage of 12 volts (+/−6 volts). The maximum capacitance per foot for line 12 is determined by the equation:

$$C=L((1/f/12).02)/V,$$

where C is the maximum capacitance per foot, L is the length of line 12, f is the baud rate of the system, and V is the operating voltage. For an operating voltage of 12 volts, baud rate of 1200, and assumed maximum length of line 12 at 5000 feet, the maximum capacitance per foot is 23 pF/ft. Typical twin-axial computer cables easily fall within this limitation. For example, a Metro Wire TM MWC-7020 150 ohm shielded twin-axial cable has a capacitance of 8.8 pF/ft.

Figure 3:
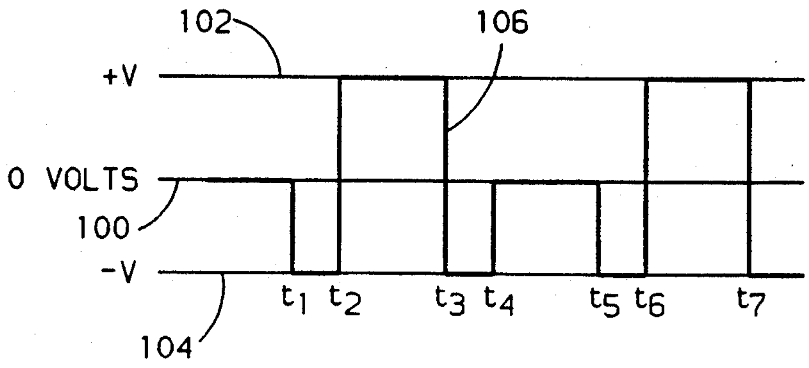
FIG. 3 is an illustration of an example portion of a serial data signal of the type implemented by this invention.

An example portion of a data signal 106 from line 12 is shown in FIG. 3. The data signal is synchronized in a tristate protocol so no start or stop bits are required. Line 100 represents the zero voltage level, line 102 represents the 6 volts level and line 104 represents the −6 volts level. The portions of signal 106 between times $t_1$ and $t_2$, $t_3$ and $t_4$, and $t_5$ and $t_6$ represent synchronizing pulses. The portion of signal 106 between times $t_4$ and $t_5$ represent a zero (0) data bit and the portions of signal 106 between times $t_2$ and $t_3$ and between times $t_6$ and $t_7$ represent one (1) data bits.

The synchronized data in line 14 is separated into synchronization pulses and data pulses by sync and data separator 14. The sync and data separator uses the synchronization pulse to generate a clock pulse on line 18, which is input to the clock of the input shift registers 20 and triggers the bit counter 30. The data signal on line 16 is input into the serial input of shift registers 20 and is clocked into the shift registers with the clock pulses on line 18. The data at the shift register outputs is discrete data.

The bit counter 30 serves as monitoring logic to determine when the last bank bit has been received. As data is received, the bit counter increments with each data bit. When the bit counter reaches a predetermined count indicating that the last data bit has been received, it outputs a RESET signal through line 34 to mode flip flop 36 and to data latches 42. The data latches, upon receipt of the RESET signal from line 34, latch in the discrete data at the output bus 26 of shift registers 20. The data latches also receive discrete data from the push buttons. If one of the push button switches 22 is depressed during the reset signal (reset signals occur every few milliseconds) the push button data in bus 28 has priority over the corresponding input shift register data in bus 26, and is latched in to the corresponding latch of the data latches 42.

The data latched into data latches 42 is output through bus 46 to lamp drivers 48, which, through bus 50, drive indicator lamp 52 corresponding to data received through line 12 and push buttons 22.

The mode flip flop 36 controls whether the circuit is in the SEND mode or the RECEIVE mode. The above operational description is for the circuit in the RECEIVE mode. When the mode flip flop 36 receives the RESET signal from the bit counter 30, the mode flip flop 36 is set, causing the circuit to be in the SEND mode.

When the circuit is in the SEND mode, a signal from mode flip flop 36 is sent through line 24 to the shift/load input of the output shift registers 56, so that the output shift registers 56 load in the discrete data on bus 26 at the input to the data latches 42. A signal is also sent through line 38 to clock 40, which clocks the output shift registers 56. The shift registers, clocked by clock 40, shift the discrete data through the registers and out a serial port, converting the discrete data to serial data.

The data output from the output shift register is stored for one cycle in the output flip flop 60 and is then output to the line driver 68, through line 64. The output of clock 54 drives the sync pulse generator 62, which generates a 100 microsecond pulse that is output to the line driver 68. The line driver 68 amplifies the line 12 with the composite components of output flip flop 60 and sync pulse generator 62. The line driver inverts the sync pulse to the negative supply rail while data one signals are output at the positive supply rail. The resulting transmitted signal is the second serial data burst and is of the type shown in FIG. 3.

As the data is output when the circuit is in the SEND mode, the data is echoed back to the input shift registers 20 as described above with reference to the RECEIVE mode. When the last data bit is output to line 12 in the SEND mode, the bit counter 30 outputs another RESET signal to mode flip flop 36. With this RESET signal, the mode flip flop 36 toggles the circuit into the RECEIVE mode, disabling the output shift registers 56 by turning off clock 40.

In the RECEIVE mode again, the circuit operates as described above, receiving data through line 12 until the bit counter outputs another RESET command, indicating the end of the input data burst, when it is toggled back to the send mode.

Missing pulse detector 70 detects missing synchronizing pulses and outputs a RESET TIME-OUT signal on line 32, which resets the bit counter 30. In one of the panels, the RESET TIME-OUT signal triggers mode flip flop 36 to reset to the SEND mode. In the other panel, a /RESET TIME-OUT signal triggers mode flip flop 36 to reset to the RECEIVE mode.

Figure 4:
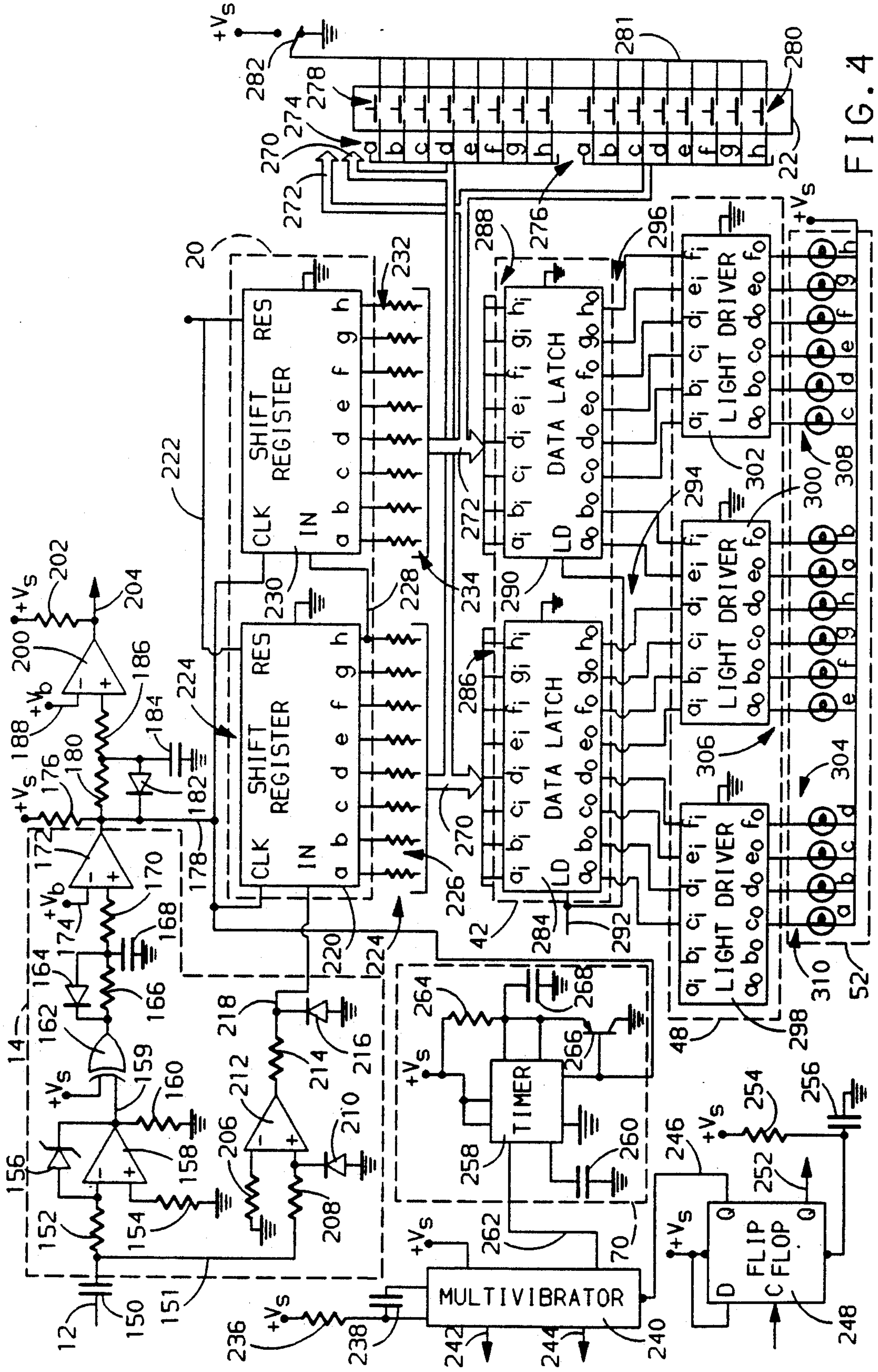
FIGS. 4 and 5 are detailed circuit diagrams of an example implementation of this invention.
Figure 5:
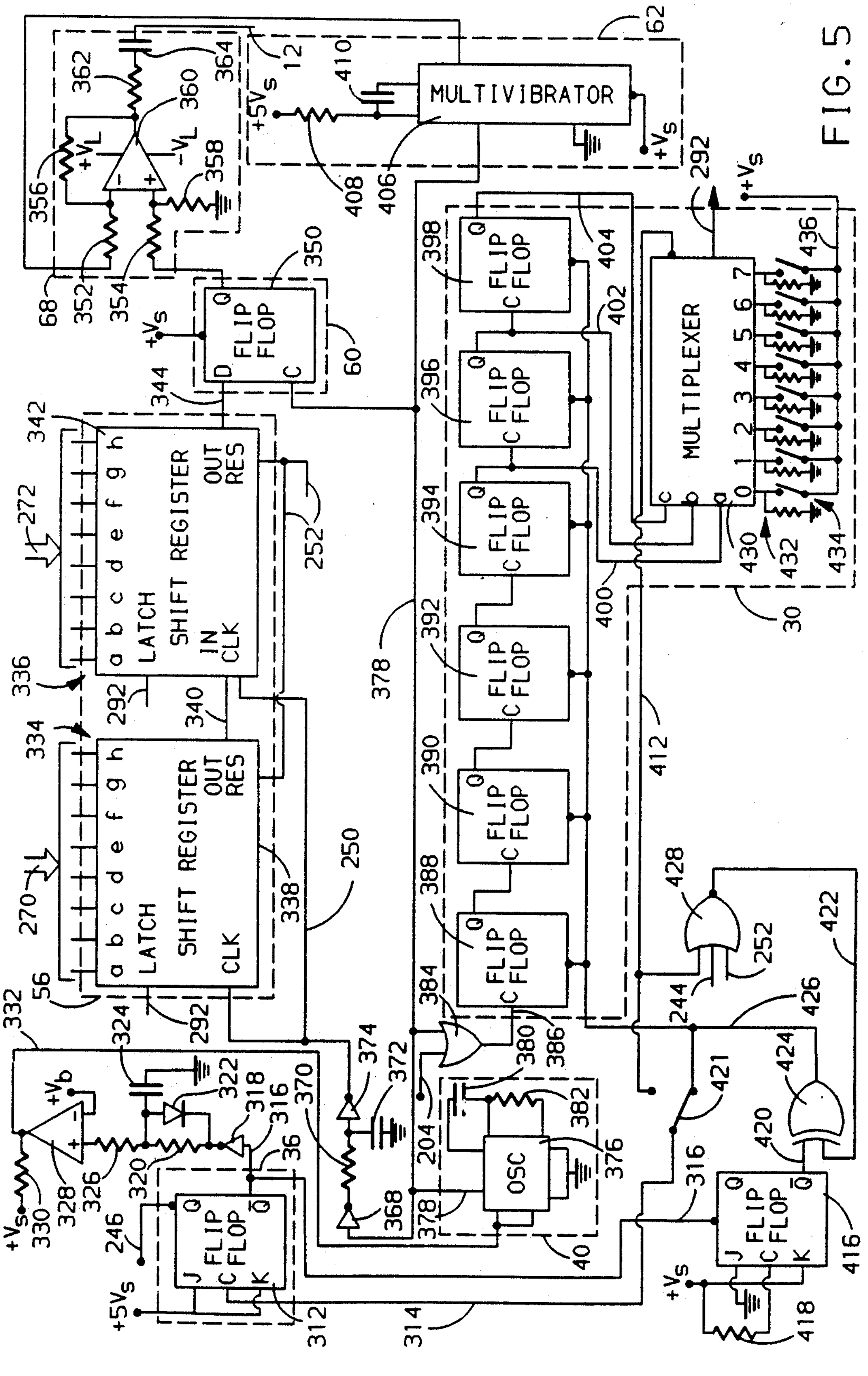

Referring to the detailed circuit diagram of this invention in FIGS. 4 and 5, line 12 is AC coupled to line 151 in the sync and data separator 14 via capacitor 150 (0.47 uF). In the implementation shown, the sync and data separator 14 includes two operational amplifiers 158 and 212 to detect the synchronization and data pulses from the signal received in line 12. The synchronization pulses are used to clock the circuit while in the RECEIVE mode.

To detect the synchronization pulses, the signal on line 151 is coupled via resistor 152 (47 KΩ) to the inverting input of amplifier 158, which has its non-inverting input tied to ground via resistor 154 (47 KΩ). When the negative synchronization pulse is input to amplifier 158, amplifier 158 outputs a positive pulse on line 159, which brings the output of the XOR gate 162 to zero. With the trailing edge of the synchronization pulse, amplifier 158 no longer has a high output, and diode 156 (e.g., 1N4731A) limits the signal on line 159, which is coupled to ground via resistor 160 (1 KΩ), to 4.3 volts. When this occurs, the XOR gate 162 outputs a high signal.

The pulsing output of XOR gate 162 is delayed by the comparitor circuit comprising capacitor 168 (0.001 uF), resistors 166 (150 KΩ) and 170 (10 KΩ), diode 164, and comparator 172 (LM339), which has its inverting input, line 174, tied to voltage supply $V_b$ (2.5 volts). The signal on line 178, the output of comparitor 172 is delayed approximately 0.15 ms to allow the data signal to settle before being clocked into the input shift registers 20. The signal on line 178 is fed to the clock inputs of the shift registers 220 and 230 (MM75HC164N) and is fed to the missing pulse detector 70.

Amplifier 212 receives the signal on line 151 in its non-inverting input via resistor 208 (180 KΩ) and has its inverting input tied to ground via resistor 206 (3.3 MΩ). Diode 210 is connected between ground and the non-inverting input of amplifier 212 to prevent the non-inverting input from falling substantially below ground. The output of amplifier 212 is the data portion of the signal from line 12 and is fed to the serial data input of shift register 220 via resistor 214 (1 KΩ) and line 218. Diode 216 (1N4731A) limits the signal voltage on line 218.

As shift register 220 is clocked by the signal in line 178, the data input to the shift register 220 is clocked through the registers a-h. Data at the last register, h, is connected to the serial data input of shift register 230 with line 228, so that data can be clocked through registers a-h of shift register 230.

The clock signal on line 178 is passed through a second time delay circuit comprising resistors 180 (100 KΩ) and 186 (10 KΩ), diode 182, capacitor 184 is coupled to the inverting input of comparator 200 while the non-inverting input of comparator 200 is tied to $+V_b$ voltage supply (2.5 volts) through line 188. The output line 204 of comparator 200, which defaults to the supply voltage (5 volts) through resistor 202 (1 KΩ), carries the clock signal delayed by another 0.08 ms with the values shown.

The delayed clock signal on line 204 triggers the bit counter 30 via OR gate 384 (FIG. 5) and line 386. Bit counter 30 comprises six flip flops 388, 390, 392, 394, 396, and 398 (76HC76N), which serve as binary counters. Line 386 is connected to the C input of flip flop 388, which has its Q output connected to the C input of flip flop 390, which is similarly connected to flip flop 392, etc., as shown. The Q outputs of flip flops 394, 396 and 398, representing the three most significant counted bits, are connected to the address input of the multiplexer 430 (MM74HC151N).

Multiplexer 430 (MM74HC151N) has its inputs 0–7 default biased to ground with resistors 432 (1 kΩ each). Each input can be biased with the positive supply voltage through switches 434 (e.g., a dip switch) and line 436. The state of the input switches 0–7 to the multiplexer 430 configures the circuit for the number of operator stations. The circuit as designed is expandable in groups of eight station connections. With each set of eight stations added on to the system, an additional input shift register, an additional output shift register, an additional data latch, additional switches, additional lights and additional light drivers are added. This expansion is easily accomplished, e.g., the additional input shift register is installed with the clock connected to line 178, and the data input connected to the last register output of the preceding input shift register. The additional data latch, light drivers, switches and lamps are connected similarly to the existing data latch, light drivers, switches and lamps, and the additional output shift register is connected with its clock connected to line 250, its input registers connected to the additional data latch input, its serial input connected to the serial output of the preceding output shift register, and its serial output connected to the output flip flop (some of these details are explained further below).

The switches 434 are configured to indicate the number of sets of eight operator stations that are implemented in the system. For example, if the system is connected to only one set of eight operator stations, the switch at the 0 input of multiplexer 430 is closed. If the system is connected with two sets of eight operator stations, as shown, then the switches at the 0 and 1 inputs of the multiplexer 430 are closed. Each succeeding switch is closed when another set of eight operator stations is added to the system. In this manner the number of data bits in each data burst received and sent is set in the circuit.

When the address inputs to multiplexer 430 indicate that the last data bit of the data burst is received, the multiplexer 430 outputs in line 292 a RESET signal (inverse of the RESET signal), and in line 412 the RESET signal.

Line 292 is connected to the load inputs of data latches 284 and 290 (MM74HC165N). The data inputs 286 and 288 of the data latches 284 and 290 are coupled to the register outputs 224 and 232 of shift registers 220 and 230 through resistor networks 226 and 234 (1 KΩ each) and data buses 270 and 272. When the data latches receive the /RESET signal at the load input through line 292, the data latched into the data latches is the data on the output of shift registers 220 and 230, or, if for any data input $a_i$-$h_i$ of each shift register the corresponding push button 278, 280 is depressed, a data one (or zero, depending upon whether the circuit is in the request or acknowledge panel) is latched into the data latch at that input.

The outputs 294 and 296 of the data latches 284 and 290 are connected to the inputs of light drivers 298, 300 and 302, which may be open collector inverter circuits (64S06). The outputs 304, 306 and 308 of the light drivers 298, 300 and 302 drive lamps 310 in accordance with the data latched into data latches 284 and 290.

The push buttons 278 and 280 are connected to data buses 270 and 272 through lines 274 and 276 and are configured for either implementation in an acknowledge panel or a request panel via switch 282. For the request panel, switch 282 is toggled connecting common line 281 of the push buttons 278 and 280 to the positive supply voltage, so that the corresponding latched data is high, and the corresponding lamp 310 is turned on when a push button is depressed. For the acknowledge panel, switch 282 is toggled connecting line 281 to ground, so that the corresponding latched data is low, and the corresponding lamp is turned off when the push button is depressed.

The RESET signal on line 412 is used to reset the bit counter 30 through NOR gate 428, XOR gate 424 and line 426. Line 426 is connected to the reset inputs of flip flops 388, 390, 392, 394, 396 and 398.

Through switch 421, the circuit can have two configurations. In the first configuration, switch 421 couples line 314 to line 412 and the mode flip flop 36 is clocked only by the RESET signal on line 412. In the second configuration, switch 421 couples line 314 to line 426, and the mode flip flop 36 is clocked by either the RESET signal on line 412, by the RESET TIME-OUT signal on line 244, or by the POWER UP RESET on line 252, via NOR gate 428.

The mode flip flop 36 comprises J/K type flip flop 312 (74HC113N), which is set by the signal in line 314, the RESET signal indicating that the last data bit has been received. When flip flop 312 is set, the circuit is in the SEND mode.

When flip flop 312 is set, the /Q output, line 316 is low, resetting flip flop 416 (74HC113N). Flip flop 416 has its /Q output connected, via line 420, to XOR gate 424, which outputs a signal on line 426 enabling flip flops 388, 390, 392, 394, 396 and 398.

Invertor 318 inverts the signal on line 316, and sends a high signal through a third time delay circuit comprising resistors 320 (150 KΩ) and 326 (10 KΩ), capacitor 324 0.0047 uF), diode 322, and comparator 328 (LM339), which has its inverting input connected to the $+V_b$ power supply. The output of comparator 328 turns on oscillator 376 (CD4047) in clock 40. The delay in turning on oscillator 376 is implemented to give the unit which sent the last bit of data time to complete its cycle and switch to the RECEIVE mode.

Resistor 382 (330 KΩ) and capacitor 380 (0.001 uF) control the frequency of the oscillator 376 to substantially twelve hundred hertz. Temperature stabilization of the oscillator is not necessary since the protocol of the circuitry is self synchronizing.

The oscillator outputs a clock signal in line 378 and, via OR gate 384, clocks bit counter 30. The signal on line 378 is delayed by the circuit comprising invertors 368 and 374, resistor 370 (10 Ω) and capacitor 372 0.047 uF). The resulting delayed clock signal on line 250 is used to clock the output shift registers 56 via the clock inputs of shift registers 338 and 342.

The /RESET signal on line 292 is coupled to the latch inputs of the output shift registers 338 and 342. Upon receipt of the /RESET signal, the output shift registers 338 and 342 latch in the data on register input lines 334, 336, which are connected to data buses 270 and 272.

When the information on buses 270 and 272 is latched into the shift registers 338 and 342, the delayed clock signal on line 250 clocks the data through the registers. The serial output of register 338 is connected, through line 340, to the serial input of register 342 and the serial output of register 342 is connected, through line 344, to output flip flop 60.

Output flip flop 60 and sync pulse generator 62 are clocked by the clock signal on line 378. The output flip flop 60 comprises D type flip flop 350 (74HC74N), with the D input connected to line 344 and the C input connected to line 378. Flip flop 350 stores the data from the serial output of shift register 342 for one cycle and then supplies the data to line driver 68.

The sync pulse generator 62 comprises a stable multivibrator 406 (MM74HC123N). Resistor 408 (3.3 KΩ) and capacitor 410 0.047 uF) configure the multivibrator so that it sends out a short pulse, e.g., 100 us, to the line driver 68.

Line driver 68 comprises amplifier 360 (LM6601N) and resistors 352 (4.6 KΩ), 354 (47 KΩ), 356 (82 KΩ), and 358 (0.47 KΩ). Line driver 68 amplifies the composite contents of the Q output of flip flop 350, which is connected to the non-inverting input of amplifier 360, and the output of multivibrator 406, which is connected to the inverting input of amplifier 360. Amplifier 360 amplifies the input from sync pulse generator 62 input ten times more than the input from flip flop 350. This causes amplifier 360 to output the synchronizing signal at the negative rail voltage (−6 volts). The output of line driver 68 is AC coupled to line 12 through resistor 362 (75 Ω) and capacitor 360 (0.47 uF).

When the last bit of data is transmitted through line 12, bit counter 30 outputs the RESET signal in line 412, which resets flip flop 312. When flip flop 312 is reset, clock 40 is turned off, and the circuit is ready to receive a data burst as described above. In this manner, the circuit operates in a cycle, alternately receiving and transmitting bursts of data every few milliseconds.

The missing pulse detector 70 is implemented with a 555 timer in a standard circuit configuration with resistor 264 (180 KΩ), capacitors 260 (0.01 uF) and 268 (0.47 uF) and transistor 266 (2N5087) for detecting missing pulses. When a missing pulse is detected, timer 258 outputs a signal on line 262 to multivibrator 240 (MM74HC123N).

When multivibrator 240 receives the signal from line 262, it triggers a RESET TIME-OUT signal on line 244 and a /RESET TIME-OUT signal on line 242. Line 244 is connected to one of the gate inputs of NOR gate 428. When switch 421 is connected to line 412, the circuit is configured to reset to the SEND mode and the signal on line 242 resets the bit counter 30 (via line gates 428, 424 and line 426). When switch 421 is connected to line 426, the circuit is configured to reset to the RECEIVE mode and the signal on line 242 resets the bit counter 30 and sets the flip flop 312 (via gates 428 and 424 and lines 426 and 314).

At power up, flip flop 248 outputs a POWER RESET signal in line 252 and a /POWER RESET signal in line 246. The signal in line 246 triggers multivibrator 240, resetting the circuit in the manner described above. Line 252 resets output shift registers 338 and 342.

The apparatus of this invention as described above provides a low cost solution to in plant communications. The circuit described above is suitable for both the request panel and the acknowledge panel. The circuit as described above is expandable in multiples of eight to a total of sixty four inputs and outputs by simply adding shift registers, data latches, light drivers, push buttons and lamps The circuit can be further expanded if a larger multiplexer and bit counter are added.

In operation, an interruption of the receipt of a data burst causes the entire burst to be ignored Normal circuit operation resumes upon the receipt of the data stream. The circuit is designed so that if battery back up is added to the data latches, data is retained until power is resumed, at which point communications resumes.

Simply toggling switches 421 and 282 configures the circuit to be set for either a request panel or an acknowledge panel. As an alternative, switches 421 and 282 can be omitted, and jumpers may be used to configure the circuit.

The circuit of this invention may be easily adapted for installation into an automatic calling system by replacing push buttons with an interface to an external computer. Additionally, the apparatus of this invention is well suited for a cost effective implementation in any andon system where the distance between the caller and receiver is great.

The above described implementation of this invention is the preferred implementation. Component specifications and values given above are the preferred specifications and values and are not limiting on this invention. Furthermore, various aspects of the circuit described above are simply design choices and are not limiting on the scope of this invention. Moreover, various improvements and modifications to this invention will occur to those skilled in the art and fall within the scope of this invention, as defined below.

The embodiments of the invention in which an exclusive property or privilege is claimed are defined as follows:

1. An apparatus for use in synchronous manufacturing systems, comprising:
   a set of operator stations, each station of the set comprising an operator input device, including at least one operator push button, and an operator indicator means, including at least one operator indicator lamp, each operator push button, when depressed, sending a request signal;
   a request panel coupled to the operator stations;
   an acknowledge panel comprising a set of acknowledge input devices and acknowledge indicator means including an acknowledge push button and an acknowledge indicator lamp corresponding to each operator pushbutton and operator indicator lamp, each acknowledge push button, when depressed, sending an acknowledge signal;

a serial interface coupling the request panel and the acknowledge panel;

first means, within the request panel and coupled to the serial interface, for receiving first serial data in a first data burst through the serial interface and for converting that serial data to discrete data corresponding to bits of on and off status data, each bit corresponding to one request indicator lamp and one acknowledge indicator lamp;

second means, within the request panel and coupled to each operator input device and to each operator indicator means, for altering bits of the discrete data in response to the request signals from the operator push buttons such that the altered bits are on status data for the corresponding request indicator lamps and the corresponding acknowledge indicator lamps;

third means, within the request panel and coupled to the second means and to each operator indicator means, for driving the operator indicator lamps in response to the discrete data;

fourth means, within the request panel and coupled to the second means and to the serial interface, for converting the discrete data to second serial data and transmitting the second serial data in a second data burst through the serial interface;

fifth means, within the acknowledge panel and coupled to the serial interface, for receiving the second data burst through the serial interface and for converting second serial data in the second data burst to the discrete data;

sixth means, within the acknowledge panel and coupled to the fifth means and to the acknowledge input devices, for altering bits of the discrete data in response to the acknowledge signals from the acknowledge push buttons such that the altered bits are off status data for the corresponding request indicator lamps and the corresponding acknowledge indicator lamps;

seventh means, within the acknowledge panel and coupled to the acknowledge indicator lamps and to the sixth means, for driving the acknowledge indicator lamps in response to the discrete data;

eighth means, within the acknowledge panel and coupled to the sixth means and to the serial interface, for converting the discrete data to the first serial data and transmitting the first serial data in the first data burst through the serial interface, wherein the first and second data bursts include synchronizing signals so that the apparatus is self synchronizing and wherein the apparatus operates in a cylical manner with the request panel and acknowledge panel each alternately receiving a data burst and then sending a data burst.

2. The apparatus of claim 1 wherein the data bursts are synchronized in tristate protocol.

3. The apparatus of claim 1 wherein the serial interface comprises of two wires connecting the request panel and the acknowledge panel.

4. A circuit comprising:

a serial data line;

first means, coupled to the serial data line, for receiving a first serial data burst through the serial data line and for converting the first serial data burst to a first set of discrete data;

second means, coupled to the first means and to a set of indicator lamps, for driving the set of indicator lamps in response to the set of discrete data;

third means, coupled to a set of push buttons and to the first means, for receiving additional discrete data from the set of push buttons, wherein the additional discrete data from the push buttons has priority over the first set of discrete data; and fourth means, coupled to the first and third means and to the serial data line, for converting all of the discrete data to serial data and for transmitting the serial data through the serial data line in a second serial data burst;

wherein the circuit is implemented in a system comprising a request panel and an acknowledge panel, each panel including one of the circuits, wherein the request panel is connected to a set of operator stations, each operator station including an operator push button and an operator indicator lamp, wherein the acknowledge panel includes an acknowledge push button and an acknowledge indicator lamp corresponding to each operator station;

wherein, in the request panel, the additional discrete data from the set of push buttons signals corresponding operator and acknowledge indicator lamps to be lit, and wherein, in the acknowledge panel, the additional discrete data from the set of push button signals corresponding operator and acknowledge indicator lamps to be off.

5. A circuit apparatus comprising:

a separator circuit for receiving a signal burst comprising a synchronized data signal including a last data bit and for outputting a clock signal in response to a synchronizing portion of the synchronized data signal and a data signal in response to a data portion of the synchronized data signal;

an input shift register circuit connected to the separator circuit, the input shift register circuit clocking the data signal through a set of shift registers in response to the clock signal so that each shift register of the set of shift registers contains a discrete data signal;

a bit counter circuit for counting bits of the data signal received and for outputting a latch signal when the last data bit is received;

a set of push buttons, each push button providing an additional discrete data signal if depressed;

a data latch circuit connected to the bit counter circuit, the set of push buttons and the set of shift registers in the input shift registers circuit, the data latch circuit receiving the latch signal from the bit counter circuit and latching in the discrete data signals from the set of shift registers and the set of push buttons, wherein discrete data signals from push buttons that are depressed have priority over discrete data signals from the set of shift registers;

a lamp driver circuit for driving a set of indicator lamps in response to the discrete data signals latched in the data latch circuit;

a mode circuit sending out a mode signal in response to the latch signal;

a clock circuit outputting and ceasing outputting of a second clock signal in response to the mode signal;

an output shift register circuit connected to the mode circuit, the clock circuit, the set of push buttons, and the set of shift registers of the inputs shift register circuit, the output shift register circuit latching in the discrete data signal from the set of shift registers of the input shift register circuit, the output shift register circuit, in response to the second clock circuit, clocking the data through a set of output shift registers and out a serial output port in a serial output data signal;

a sync pulse generator for generating an output synchronizing pulse in response to the second clock signal;

a line driver for combining the serial output data signal and the output synchronizing pulse into an output synchronized data signal that is transmitted in an output data burst on the serial data line.

* * * * *